United States Patent
Schwärzler et al.

(10) Patent No.: US 6,273,825 B1
(45) Date of Patent: Aug. 14, 2001

(54) MONOBLOC JOINT WITH CENTERING MEANS

(75) Inventors: Peter Schwärzler, Glattbach; Wolfgang Löbel, Frankfurt; Hans-Heinrich Welschof, Rodenbach, all of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/358,333

(22) Filed: Jul. 21, 1999

(30) Foreign Application Priority Data

Jul. 30, 1998 (DE) .............................................. 198 34 313

(51) Int. Cl.[7] ........................................................ F16D 3/16
(52) U.S. Cl. ........................... 464/139; 464/906; 464/146
(58) Field of Search .................................. 464/139, 140, 464/141, 142, 143, 144, 145, 146, 906, 179

(56) References Cited

U.S. PATENT DOCUMENTS

| 2,075,563 | * | 3/1937 | Alden | 464/146 |
| 3,367,139 | * | 2/1968 | Ristau | 464/146 |
| 3,541,809 | * | 11/1970 | Howey | 464/146 |
| 3,613,398 | * | 10/1971 | Hasegawa et al. | 464/906 |
| 4,493,388 | * | 1/1985 | Welschof et al. | 464/145 |
| 4,702,526 | * | 10/1987 | Sankey | 301/6 WB |
| 5,486,053 | * | 1/1996 | Beagley et al. | 464/178 |
| 5,549,514 | * | 8/1996 | Welschof | 464/145 |
| 5,590,967 | * | 1/1997 | Kapaan | 384/448 |
| 5,806,936 | * | 9/1998 | Guimbretiere | 301/105.1 |

* cited by examiner

*Primary Examiner*—Lynne H. Browne
*Assistant Examiner*—Kenneth Thompson

(57) ABSTRACT

An assembly consisting of a constant velocity universal joint having an outer joint part, an inner joint part and torque transmitting elements which, in the direction of rotation, constitute positive engaging means between the outer joint part and the inner joint part and having a shaft attachment flange. The outer joint part and the shaft attachment flange comprising threaded attaching means for the purpose of being threaded to one another. The threaded attaching means are positioned at the circumference on a diameter outside a rolling circle of the torque transmitting elements. Centering means are provided for centering the outer joint part relative to the shaft attachment flange. The outer joint part comprises an integrally formed-on base on the side of the shaft attachment flange and the entering means are provided directly on the base on a diameter inside the rolling circle of the torque transmitting elements.

7 Claims, 3 Drawing Sheets

MONOBLOC JOINT WITH CENTERING MEANS

BACKGROUND OF THE INVENTION

The invention relates to a constant velocity joint having an outer joint part, an inner joint part and torque transmitting elements which, in the direction of rotation, constitute positive engaging means between the outer joint part and the inner joint part. The outer joint part comprises means for threading the positive engaging means to a shaft attachment flange, which threading means are positioned at the circumference on a diameter outside the rolling circle of the torque transmitting elements.

The invention also relates to an assembly consisting of a constant velocity universal joint having an outer joint part, an inner joint part and torque transmitting elements which, in the direction of rotation, constitute positive engaging means between the outer joint part and the inner joint part and a shaft attachment flange. Not the joint but the assembly includes a shaft attachment flange. Both the outer joint part and the shaft attachment flange comprising threaded connecting means for the purpose of being threaded to one another. The threaded connecting means are positioned at the circumference on a diameter outside a rolling circle of the torque transmitting elements. Also, there is provided centering means for centering the outer joint part relative to the shaft attachment flange.

The constant velocity joints mentioned here include all joint types provided for being threaded on, i.e., fixed joints and plunging joints. Both categories include universal ball joints, with the torque transmitting means constituting balls which run in outer ball grooves and inner ball grooves which are held by a ball cage in a common plane, as well as tripod joints wherein the torque transmitting elements are tripod rollers which are held on tripod arms of an inner joint part and roll in tracks of the outer joint part.

To the extent that reference is made to a rolling circle diameter, the latter, in constant velocity ball joints, is the diameter of the circle through the ball centers when the joint is in the aligned position. In the case of tripod joints, the rolling circle diameter is the diameter of the circle through the roller points of contact with the tracks when the joint is in the aligned position.

In the present case, said shaft attachment flange is always slipped onto an output shaft of a gearbox. Said gearbox can be a manual or an automatic gearbox, with the gearbox output shaft then being connected by means of the constant velocity joint in question to a propeller shaft or cardan shaft in the widest sense. Instead of a gearbox, it is also possible to use a differential drive, in which case the respective differential output shaft is coupled by the constant velocity joint in question to a side shaft leading to the driving wheels.

The shafts connected by said joints to the gearbox output flanges are balanced prior to being fitted in the vehicle because any out-of-balance can be transferred in the form of vibrations to the vehicle and, thus, has to be avoided. When fitting the shafts via the threading means of the constant velocity joint to a gearbox output flange, inadequate centering can again lead to out-of-balance. This adversely affects the noise behavior and the driving comfort, because after completion of the assembly operation, the vehicle, as a rule, does not undergo any further balancing operations. Normally, the centering means are provided at the outer joint part and at the flange on the outer diameter of the outer part. However, centering of the gearbox output flange relative to a gearbox output shaft takes place in the region of the shaft splines of a splined sleeve at the flange on the one hand and of a splined portion at the free shaft end of the gearbox output shaft on the other hand. The accurately executed centering measures carried out between the flange and the outer joint part are nullified by the possible axis offset of the flange relative to the gearbox output shaft. This offset may occur in the region of the shaft splines.

It has already been attempted to use an additional centering element between the outer joint part and the gearbox output shaft which, as a formed sheet metal part, is centered on the outer diameter of the outer joint part on the one hand and on the extended shaft end of the gearbox output shaft on the other hand. In this case, the insufficiently centered shaft flange can only contribute by means of its own mass to a small amount of out-of-balance, whereas the well-balanced shaft is well-centered by the sheet-metal-cover-like centering element relative to the gearbox output shaft. However, the disadvantage is that the tolerances or centering errors between the gearbox output shaft and the centering element on the one hand, and between the centering element and the outer joint part on the other hand are added up, so that, in total, there occurs a considerable axis offset of the shaft connected by the joint relative to the gearbox output shaft. This axis offset leads to a considerable amount of out-of-balance. In addition, said sheet metal element is relatively soft so that, when the threading means between the flange and outer joint part are tightened, the threading means can possibly be distorted. Finally, the centering elements produced so far comprise a central opening, so that an additional transport cover has to be provided to seal the joint during transport.

SUMMARY OF THE INVENTION

It is, therefore, an object of the present invention to provide a constant velocity joint which permits improved centering relative to a gearbox output shaft, and an assembly consisting of a constant velocity joint and a shaft attachment flange with centering means which have been improved accordingly.

The objective is achieved in that the outer joint part comprises an integrally formed-on base on the side of the shaft attachment flange and that, directly on the base, there are provided centering means on a diameter inside the rolling circle of the torque transmitting elements.

With reference to a constant velocity joint of said type which is provided to be threaded onto a shaft attachment flange which, by means of a splined sleeve can be slid on to the splined portion of a gearbox output shaft, it is proposed in particular that the centering means are positioned on a diameter inside the splines diameter of the splined sleeve. In this way, centering is effected directly between the gearbox output shaft and the outer joint part, and there remains only one single tolerance between the parts provided and intended as centering means. Because the outer joint part is designed in such a way that it is closed at one end, the strength of same is increased. By providing the centering means on a small diameter, it is possible to use the substantially unchanged gearbox output shaft, especially the usual assembly sequence between the gearbox output shaft and the shaft attachment flange. The centering means can be formed by a centering bore in the base or by countersunk centering means externally formed-out in the base and co-operating with the respective centering journal on the end of the gearbox output shaft. Alternatively, it is possible to form a centering journal onto the base, which centering journal engages a centering bore on the end of the gearbox output shaft. If the countersunk means or the central journal are provided at the base, the latter is advantageously closed and provides the closure for the joint interior. There is, thus, no need to provide this embodiment with a separate transport cover for preventing the grease from leaving the joint.

The shaft splines provided between the splined sleeve and the splined portion of the gearbox output shaft have a torque transmitting function only and no longer play any part in centering the shaft connected by the joint. Only the flange itself is centered by the splines.

The journal and the centering bore can form a press-fit by engaging one another, as a result of which the centering quality is improved. Assembly and dismantling of the unit are not greatly complicated by said measure. Instead of a cylindrical centering journal, it is also possible for a spherical journal head to engage a cylindrical bore. Axial alignment is then effected in the usual way via the contacting flange faces of the outer joint part and of the flange.

BRIEF DESCRIPTION OF THE DRAWINGS

Preferred embodiments of the invention are compared with the state of the art and explained below with reference to the drawings wherein.

DETAILED DESCRIPTION OF THE PREFERRED EMBODIMENTS

Figure 1:
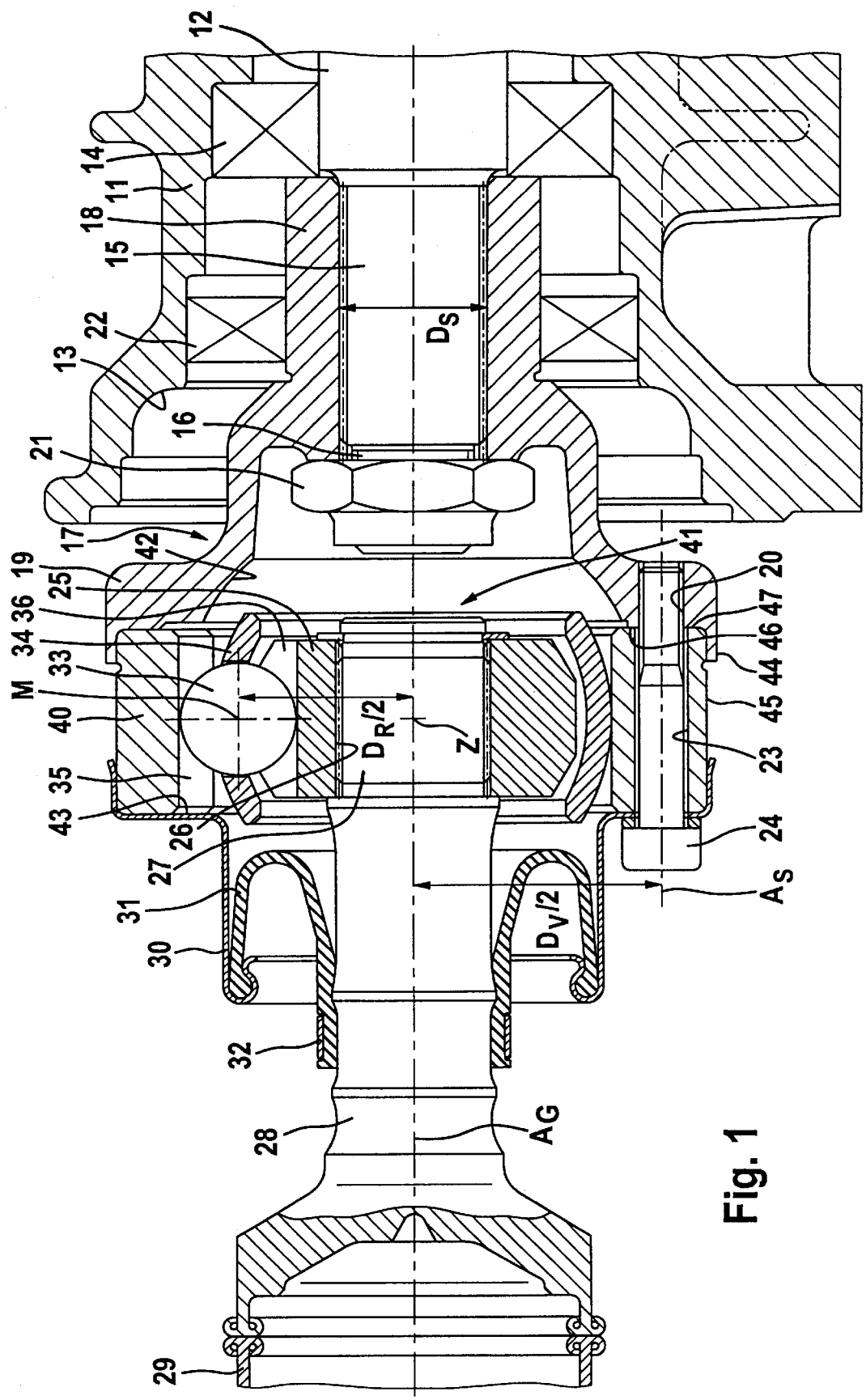
FIG. 1 shows an assembly with a threaded connection between a constant velocity universal joint and a gearbox output shaft according to the state of the art.

To the extent that the illustrated assemblies are the same in the three Figures, they will initially be described jointly. In a gearbox housing 11 which is only partially illustrated, i.e., major parts are not shown, there is supported a gearbox output shaft 12 which is also broken away in the illustration. The free end of the gearbox output shaft 12 is positioned inside a shaft opening 13 of the gearbox housing 11. The shaft 12 is supported in the housing 11 by a rolling contact bearing 14. At the shaft end, there is provided a portion with a shaft splines 15 which is followed by a threaded portion 16.

A gearbox output flange 17 comprises a splined sleeve 18 which is slid onto the splined portion 15 of the shaft 12, as well as a flange ring 19 which is connected thereto and carries threaded holes 20. The sleeve 18 is axially supported on the bearing 14 and is tensioned by a nut 21 against the bearing 14, which nut 21 is threaded onto the threaded portion 16. A seal 22 seals the sleeve 18 relative to the shaft opening 13 in the housing 11.

The outer joint part of a constant velocity joint is threaded on by a flange ring 19, the constant velocity joint in this case being a VL plunging joint. The outer joint part is provided with through-holes 23 for passing through bolts 24 which are threaded into threaded holes 20 in the flange part 19. Furthermore, the joint comprises an inner joint part 25 with inner splines 26 into which there is inserted a splined portion 27 of an attaching journal 28. A tubular shaft 29, which is broken away in the illustration, is welded to the shaft journal 28. A sheet metal cap 30 held by bolts 24 is placed onto the outer joint part, with a rolling boot 31 secured by a tensioning strip 32 on the shaft journal 28 being formed into the plate metal cap 30. In the VL joint shown here, the torque transmitting elements are balls 33 which engage ball grooves 35 in the outer joint part and ball grooves 36 in the inner joint part; there is also a ball cage 34 which holds the balls 33 in one plane.

In FIG. 1, which shows a solution according to the state of the art, the outer joint part 40 is provided with a large opening 41 at the flange end, with the flange part 19 being provided with inner faces and the sheet metal ring 30 with radial faces which form axial stops 42, 43 for the cage 34. Furthermore, the flange part 19 is provided with an outer centering projection 44 which extends over the outer circumferential face 45 of the outer joint part 40 and which radially centers the outer joint part 40 relative to the shaft attachment flange 17. The torque is transmitted by contacting end faces 46 at the flange part 17 and 47 at the outer joint part 40. Half the rolling circle diameter $D_R/2$ is given as the distance between the joint center Z and the center M of the illustrated ball. Half the threading diameter $D_V/2$ is given as the distance between the joint axis $A_G$ and the joint axis $A_S$ of the bolt illustrated.

Figure 2:
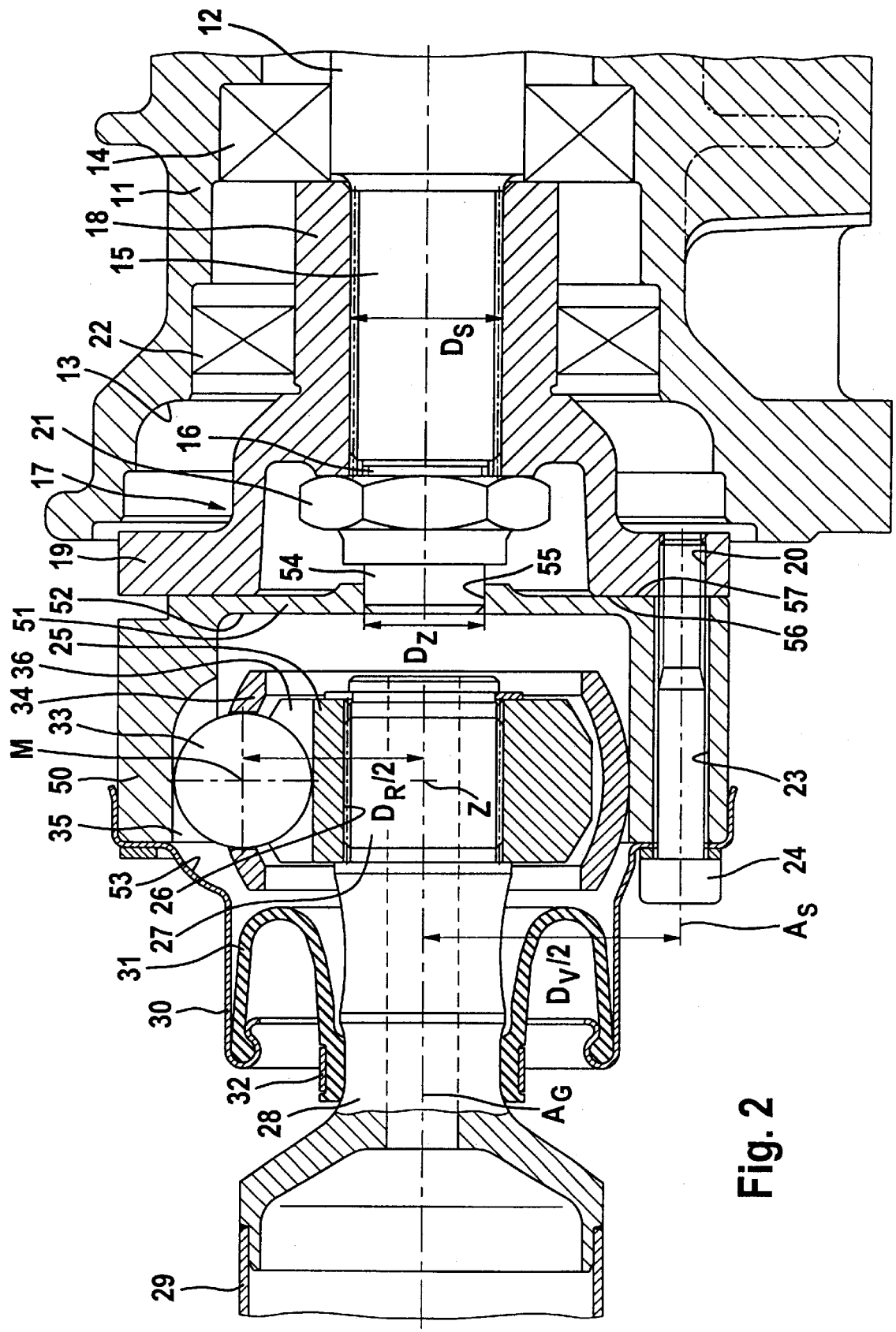
FIG. 2 shows an assembly with a threaded connection between a constant velocity universal joint and a gearbox output shaft according to the invention in a first embodiment.

In FIG. 2, the outer joint part 50 is substantially closed at the flange end by an integrally formed-on base 51. Track run-outs of the outer ball grooves 35 and formations in the sheet metal ring 30 form stops 52, 53 for the axial plunging movement of the inner joint part relative to the outer joint part. At the gearbox shaft 12, the threaded portion 16 is axially extended by a centering journal 54 which engages a centering bore 55 in the base 51 of the outer joint part 22. The journal 54 and the bore 55 engage one another and form a press-fit. The transmission of torque between the flange part 17 and the outer joint part 50 is effected by contacting end faces 56 at the flange part 19 and 57 at the outer joint part 50. Half the rolling circle diameter $D_R/2$ is shown as the distance between the joint center Z and the center M of the ball illustrated. Half the threading diameter $D_V/2$ is shown as the distance between the joint $A_G$ and the axis $A_S$ of the bolt illustrated. The effective centering diameter $D_Z$ corresponds to the diameter of the journal 54 and of the centering bore 55, respectively. It is smaller than the splines diameter $D_S$ of the splined portion 15.

Figure 3:
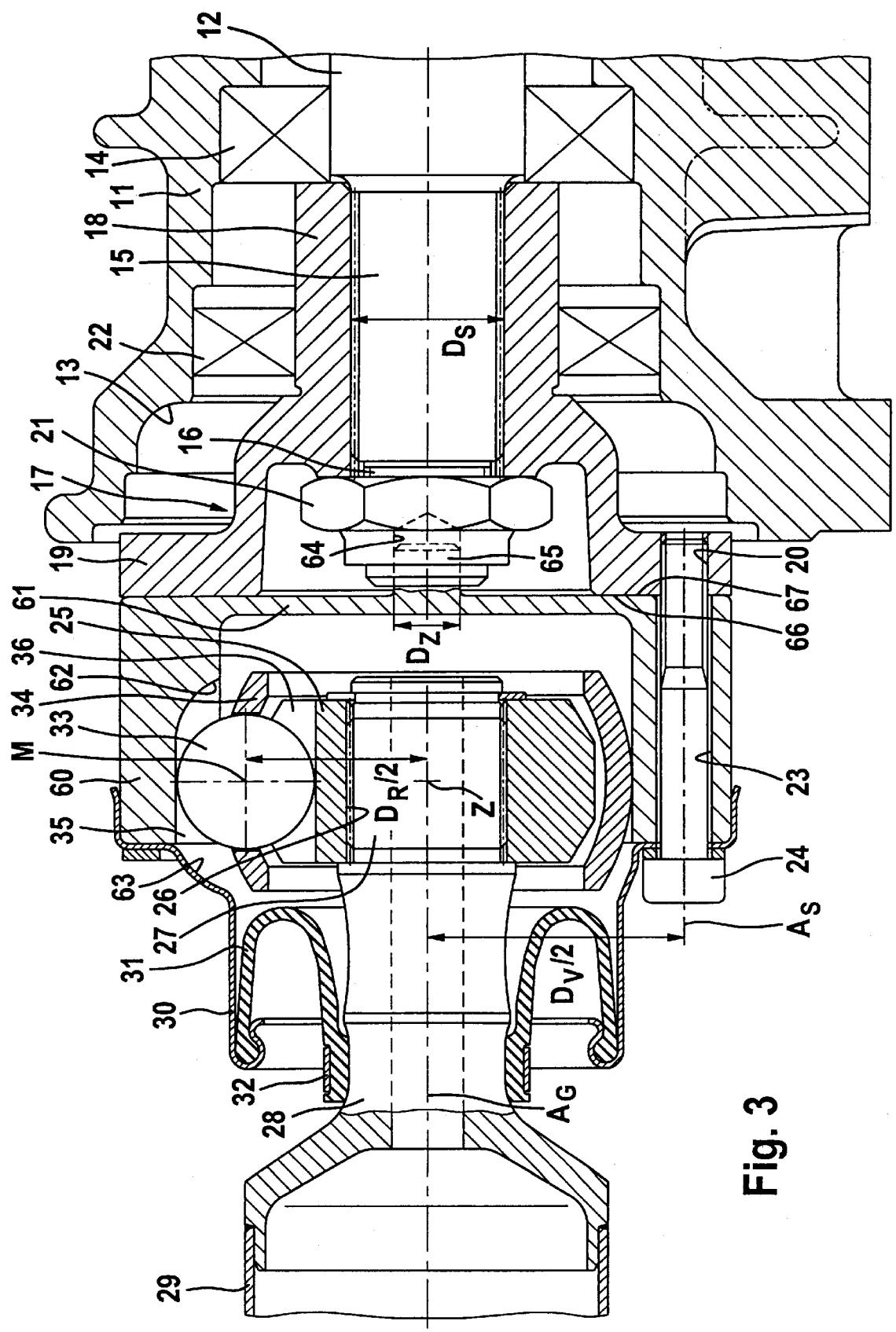
FIG. 3 shows an assembly with a threaded connection between a constant velocity universal joint and a gearbox output shaft according to the invention in a second embodiment.

In FIG. 3, the outer joint part 60 is substantially closed at the flange end by an integrally formed-on base 61. Track run-outs of the outer ball grooves 35 and formations in the sheet metal ring 30 form stops 62, 63 for the axial plunging movement of the inner joint part relative to the outer joint part. At the gearbox shaft 12, the threaded portion 16 is axially extended by an extension receiving a centering bore 64 which is engaged by a centering journal 65 at the base 61 of the outer joint part 60. The journal 65 and the bore 64 engage one another and form a press-fit. The transmission of torque between the flange part 17 and the outer joint part 60 is effected by contacting end faces 66 at the flange part 19 and 67 at the outer joint part 60. Half the rolling circle diameter $D_R/2$ is shown as the distance between the joint center Z and the center M of the ball illustrated. Half the threading diameter $D_V/2$ is shown as the distance between the joint axis $A_G$ and the axis $A_S$ of the bolt illustrated. The effective centering diameter $D_Z$ corresponds to the diameter of the journal 65 and of the centering bore 64, respectively. It is smaller than the splines diameter $D_S$ of the splined portion 15.

What is claimed is:
1. An assembly comprising a constant velocity universal joint having an outer joint part (50, 60), an inner joint pail

(25) and torque transmitting elements (33, 34) which, in the direction of rotation, constitute positive engaging means between the outer joint part (50, 60) and the inner joint part (25), and having a shaft attachment flange (17) circumferentially secured to the outer joint part on a diameter outside a rolling circle of the torque transmitting elements (33, 34) and with there being provided centering means for centering the outer joint part (50, 60) relative to the shaft attachment flange (17), wherein the outer joint part (50, 60) comprises an integrally formed-on base (51, 61) towards the shaft attachment flange (17), and wherein the centering means are provided directly on the base (51, 61) on a diameter inside the rolling circle of the torque transmitting elements (33, 34).

2. An assembly comprising a constant velocity universal joint connected to a gearbox output shaft (12), the constant velocity universal joint comprising an outer joint part (50, 60), an inner joint part (25) and torque transmitting elements (33, 34) which, in the direction of rotation, constitute positive engaging means between the outer joint part (50, 60) and the inner joint part (25), and having a shaft attachment flange (17) circumferentially secured to the outer joint part on a diameter outside a rolling circle of the torque transmitting elements (33, 34) and with there being provided centering means for centering the outer joint part (50, 60) relative to the shaft attachment flange (17), wherein the outer joint part (50, 60) comprises an integrally formed-on base (51, 61) towards the shaft attachment flange (17), and wherein the centering means are provided directly on the base (51, 61) on a diameter inside the rolling circle of the torque transmitting elements (33, 34), wherein the shaft attachment flange (17) includes a splined sleeve (18) adapted to be slid onto a splined portion (15) of the gearbox output shaft (12) such that the gearbox output shaft (12) passes through the shaft attachment flange (17) and registers with said centering means by way of matching centering means, and wherein the centering means have a diameter inside the splines diameter of the splined sleeve (18).

3. An assembly according to claim 2, wherein the matching centering means comprise a cylindrical projection (54) on the gearbox output shaft (12).

4. An assembly according to claim 2, wherein the matching centering means comprise countersunk centering means (64) in the gearbox output shaft (12).

5. An assembly according to claim 2, wherein the centering means (55, 65) and the matching centering means (54, 64) form a press-fit relative to one another.

6. An assembly according to claim 3, wherein the centering means (55, 65) and the matching centering means (54, 64) form a press-fit relative to one another.

7. An assembly according to claim 4, wherein the centering means (55, 65) and the matching centering means (54, 64) form a press-fit relative to one another.

* * * * *